Aug. 18, 1953     R. D. TURKINGTON     2,649,489

THERMOCOUPLE

Filed April 26, 1950

INVENTOR
ROBERT D. TURKINGTON

ATTORNEY

Patented Aug. 18, 1953

2,649,489

UNITED STATES PATENT OFFICE 2,649,489

THERMOCOUPLE

Robert D. Turkington, Lower Windsor, Pa., assignor to Armstrong Cork Company, Lancaster, Pa., a corporation of Pennsylvania Application April 26, 1950, Serial No. 158,291

2 Claims. (Cl. 136—4)

This invention relates to thermocouples and is concerned particularly with a thermocouple having a high degree of sensitivity, which is of rugged construction and is capable of withstanding relatively great thermal shocks.

There are many commercial operations requiring the use of thermocouples which must be inserted in liquid or semiliquid baths under agitation. This necessitates the use of a relatively rigid supporting structure for the thermocouple element to prevent bending or whipping during agitation of the material. One such use is in the boiling of drying and semidrying oils used in the manufacture of linoleum and in printing paints where the temperature of the oil must be controlled within relatively narrow limits and a high degree of sensitivity is essential to the proper treatment of the oil for such uses. The oil-boiling tanks are relatively large and the agitation is violent. The thermocouple-supporting structure, therefore, must be quite rigid and of considerable length. In order to be sensitive within the required degree and free of objectionable "lag," heat transfer from the supporting structure to the thermocouple must be minimized.

The use of conventional insulated thermocouples is not feasible in oil-boiling operations where the temperature of the liquid in which the thermocouple is bathed is high, in the order of 600° F. or more, for the insulation will not successfully withstand such operating conditions for relatively long periods of time. There is also the problem of chemical attack of the hot liquid upon the thermocouple and its supporting structure. Acid resistance is important where the unit is used in boiling oil.

The thermocouple must be heat-insulated from the massive supporting structure to secure a high degree of sensitivity, and at the same time the unit must be liquidtight to avoid the fouling of the interior of the unit and the thermocouple leads. This necessitates that the heat insulation serve a dual function of sealing and insulating.

It is an object of this invention to provide a thermocouple structure which will be extremely sensitive and will, at the same time, possess adequate strength for uses where violent agitation or the like may so require.

Another object of the invention is to provide a thermocouple structure which will not be deleteriously affected by acids.

Another object of the invention is to provide a thermocouple structure which will be capable of withstanding sudden and extreme temperature changes, in the order of 600° F.

A further object of the invention is to provide an insulated, liquid-sealed thermocouple unit which may be readily attached to a supporting structure.

Other objects of the invention will become apparent from consideration of the following description of a preferred embodiment of the invention.

The thermocouple structure includes a hollow heat-conducting tube through which pass the leads from a thermal junction disposed at or adjacent to an end of the tube. A metal casing surrounds a portion of the tube with a portion of the tube projecting beyond the casing. A metal-to-glass seal is provided between the tube and casing joining the same, insulating one from the other and forming a liquidtight seal not affected by liquids or the like and resistant to changes in temperature up to 600° F. or higher. Suitable supporting piping or the like may be secured to the casing to make a liquidtight joint, and the leads from the thermal junction extend through the tube and the supporting pipe to a suitable connection head.

In order that the invention may be readily understood, a preferred embodiment has been illustrated in the attached drawing, in which.

Figure 1:
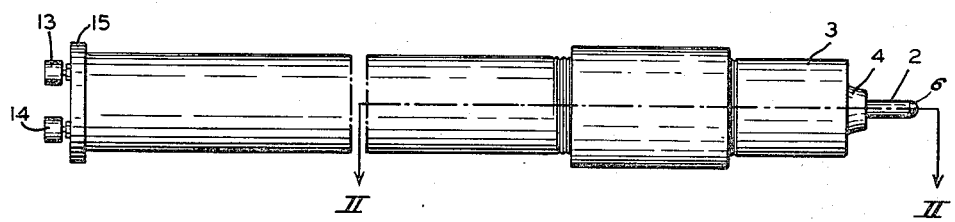
Figure 1 is a plan view of a thermocouple unit embodying the present invention connected to a supporting arrangement, with a portion thereof broken away.
Figure 2:
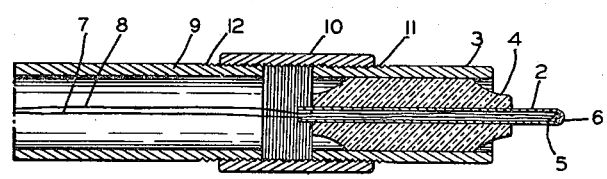
Figure 2 is a partial sectional view of the device of Figure 1 taken on the line II—II of Figure 1.
Figure 3:
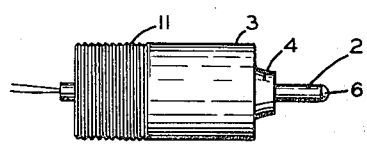
Figure 3 is a plan view of the thermocouple unit without the supporting structure.

Referring to the drawing, the device includes a tube 2 of conducting metal such as a tube of stainless steel having an outside diameter of about $\frac{3}{16}$" and an inside diameter of about $\frac{1}{8}$". Surrounding a portion of the tube 2 is a metal casing 3 which may be of stainless steel or brass having an inside diameter of about $\frac{3}{4}$" and an outside diameter of about 1". Between the tube 2 and the casing 3 there is disposed a metal-to-glass seal 4 which is formed in the conventional manner and firmly joins the tube 2 and the casing 3 and seals the outer surface of the tube 2 and the inner surface of the casing 3 against the transfer of liquid therealong. A thermocouple 5 is preferably formed at the very tip end of the tube 2 which projects beyond the end of the casing 3. Any conventional thermocouple junction may be used, such as a copper-to-constantan couple or an iron-to-constantan couple. The junction 5 is preferably covered with silver solder 6 which firmly attaches the junction to the tip end of the tube 2, serves to seal tube 2 against the entrance of liquid, and protects the couple from acid attack. This is particularly important where an iron type couple is used and acid corrosion is a problem. Leads 7 and 8 extend from the junction 5 and may be connected to temperature-indicating and/or control apparatus.

In the embodiment illustrated in the drawing, the thermocouple unit is supported by a length of brass tubing 9 which may be eight feet or more in length, depending upon the service to which the structure will be put. The length of the supporting structure is not critical. The thermocouple unit may be joined to the supporting structure by a coupling 10 screw threaded onto the projection 11 on the casing 3 and a corresponding screw thread projection 12 on the tube 9. If necessary, a sealing compound may be applied to the threads of the coupling 10 and threads 11 and 12 to insure a liquidtight seal, preventing the entrance of liquid into the tube 9 which would foul the interior thereof and the thermocouple leads 7 and 8 which pass therethrough.

In a typical arrangement, the leads 7 and 8 pass through the tube 9 and are connected to binding posts 13 and 14 which are secured to an insulating connection head 15 which may be threaded into the end of the tube 9 or may be otherwise secured thereto. Leads from suitable indicating and/or control equipment may be connected to the binding posts 13 and 14.

While certain metals have been specified for various parts of the elements of the thermocouple unit and supporting structure in the description of a preferred embodiment of the invention, it will be understood that the invention is not directed to any particular metal or metals. For instance, any metals may be used for the tube 2 and casing 3 to which an effective metal-to-glass seal may be made and which will have coefficients of expansion such that the metal-to-glass seal will not be broken upon the changes in temperature encountered in the use of the device. A highly heat-responsive metal is preferred for the tube 2 to enhance the speed of response of the device and minimize "lag."

The thermocouple unit may be readily constructed as a self-contained unit, fully sealed at the place of manufacture and supplied to the user for attachment to suitable supporting structure.

I claim:

1. A self-contained and replaceable high-sensitivity thermocouple unit comprising a hollow tube of heat-conductive metal, a metal casing spaced radially from and surrounding a portion of the tube, a metal-to-glass seal solely joining said tube and casing, a thermocouple junction disposed at the outer end of said tube and replaceably joined thereto by a mass of conductive metal which seals the outer end of said tube, a lead from said junction extending through said tube and out of the open inner end thereof, and attaching means provided on said casing for replaceably connecting said unit to a supporting structure.

2. A self-contained and replaceable high-sensitivity thermocouple unit in accordance with claim 1 in which the metal-to-glass seal is resistant to changes in temperature in the order of 600° F.

ROBERT D. TURKINGTON.

References Cited in the file of this patent

UNITED STATES PATENTS

| Number | Name | Date |
|---|---|---|
| 1,675,210 | Campbell et al. | June 26, 1928 |
| 2,343,242 | Richmond | Mar. 7, 1944 |
| 2,445,159 | Tegge | July 13, 1948 |
| 2,466,175 | Kretsch | Apr. 5, 1949 |

FOREIGN PATENTS

| Number | Country | Date |
|---|---|---|
| 482,480 | Great Britain | Mar. 30, 1938 |